US009523376B2

(12) United States Patent
Derkx et al.

(10) Patent No.: US 9,523,376 B2
(45) Date of Patent: Dec. 20, 2016

(54) DISCRETE PILOT STAGE VALVE ARRANGEMENT WITH FAIL FREEZE MODE

(71) Applicant: ABB Schweiz AG, Baden (CH)

(72) Inventors: Jeroen Derkx, Enköping (SE); Arne Trangard, Västerås (SE); Mohammadali Honarpardaz, Västerås (SE)

(73) Assignee: ABB Schweiz AG, Baden (CH)

(*) Notice: Subject to any disclaimer, the term of this patent is extended or adjusted under 35 U.S.C. 154(b) by 0 days.

(21) Appl. No.: 14/904,762

(22) PCT Filed: Jul. 18, 2013

(86) PCT No.: PCT/EP2013/065225
§ 371 (c)(1),
(2) Date: Jan. 13, 2016

(87) PCT Pub. No.: WO2015/007318
PCT Pub. Date: Jan. 22, 2015

(65) Prior Publication Data
US 2016/0153475 A1 Jun. 2, 2016

(51) Int. Cl.
*F16K 31/02* (2006.01)
*F15B 13/043* (2006.01)
*F15B 20/00* (2006.01)

(52) U.S. Cl.
CPC ....... *F15B 13/0433* (2013.01); *F15B 13/0438* (2013.01); *F15B 20/002* (2013.01); (Continued)

(58) Field of Classification Search
CPC .............. F15B 13/0433; F15B 13/0431; F15B 13/0438; F15B 2211/6355; F15B 2211/30575;F15B 2211/355; F15B 2211/6336; F15B 2211/8623; F15B 2211/527; F15B 2211/328; F15B 20/002
(Continued)

(56) References Cited

U.S. PATENT DOCUMENTS 3,874,407 A * 4/1975 Griswold ............... G05B 11/28 137/596.17
4,103,710 A 8/1978 Labit et al.
(Continued)

FOREIGN PATENT DOCUMENTS

EP 0181514 A1 5/1986
EP 0341861 A2 11/1989
(Continued)

OTHER PUBLICATIONS

International Preliminary Report on Patentability Application No. PCT/EP2013/065225 Completed: Jul. 3, 2015;Mailing Date: Jul. 3, 2015 7 pages.
(Continued)

*Primary Examiner* — Jessica Cahill
*Assistant Examiner* — Minh Le
(74) *Attorney, Agent, or Firm* — Whitmyer IP Group LLC

(57) ABSTRACT

An on-off pilot stage valve arrangement for controlling at least one main stage valve. The on-off pilot stage valve arrangement includes a first pilot valve discretely operable between two states, an on and an off state, the first pilot valve having an input at which there is a first pressure and an output connected to the main stage valve, a second pilot valve discretely operable between two states, an on and an off state, the second pilot stage valve having an input at which there is a second pressure and an output connected to the main stage valve. Both the valves are configured to be set in one of the two states in case the arrangement loses power.

13 Claims, 4 Drawing Sheets

(52) U.S. Cl.
CPC . *F15B 13/0431* (2013.01); *F15B 2211/30575* (2013.01); *F15B 2211/328* (2013.01); *F15B 2211/355* (2013.01); *F15B 2211/527* (2013.01); *F15B 2211/6336* (2013.01); *F15B 2211/6355* (2013.01); *F15B 2211/8623* (2013.01)

(58) Field of Classification Search
USPC ........... 137/487.5, 489, 485, 596.12, 599.07; 251/129.02, 129.15
See application file for complete search history.

(56) References Cited

U.S. PATENT DOCUMENTS

| | | | | |
|---|---|---|---|---|
| 4,191,091 | A * | 3/1980 | Zeuner | F15B 13/0433 137/625.64 |
| 4,241,750 | A * | 12/1980 | Furuse | G05D 16/204 137/101.19 |
| 4,675,567 | A | 6/1987 | Fujiwara et al. | |
| 4,711,267 | A * | 12/1987 | Schwelm | F15B 11/006 137/596.15 |
| 4,961,441 | A * | 10/1990 | Salter | G05D 16/2053 137/14 |
| 5,586,575 | A * | 12/1996 | Bergamini | F15B 13/0438 137/116.5 |
| 5,660,198 | A * | 8/1997 | McClaran | G05D 16/106 137/10 |
| 5,950,668 | A * | 9/1999 | Baumann | F15B 9/09 137/486 |
| 6,305,401 | B1 * | 10/2001 | Uehara | G05D 16/2093 137/102 |
| 6,338,358 | B1 * | 1/2002 | Watanabe | G05D 16/2093 137/102 |
| 6,584,999 | B2 * | 7/2003 | Inayama | G05D 16/2093 137/102 |
| 6,779,541 | B2 * | 8/2004 | Inayama | G05D 16/2093 137/102 |
| 7,121,189 | B2 * | 10/2006 | Vonderwell | F15B 11/006 91/459 |
| 7,258,058 | B2 * | 8/2007 | Smith | G05D 16/2093 251/30.02 |
| 7,814,750 | B2 * | 10/2010 | Deeg | F16H 61/2807 60/407 |
| 8,365,762 | B1 * | 2/2013 | Trotter | B64D 1/18 137/485 |
| 8,800,593 | B2 * | 8/2014 | Sakasegawa | G01F 1/684 137/486 |
| 8,847,103 | B2 * | 9/2014 | Retnaswamy | B23K 10/00 219/121.54 |
| 9,334,752 | B2 * | 5/2016 | Dietrich | F01D 21/02 |
| 2002/0036013 | A1 | 3/2002 | Inayama et al. | |
| 2007/0045579 | A1 * | 3/2007 | Wirtl | G05D 16/163 251/129.04 |
| 2011/0132475 | A1 * | 6/2011 | Eidenschink | B60T 8/3605 137/487.5 |
| 2012/0211685 | A1 | 8/2012 | Wang | |
| 2013/0174915 | A1 * | 7/2013 | Tondolo | G05D 7/0617 137/2 |
| 2013/0248032 | A1 * | 9/2013 | Schmidt | F15B 9/09 137/625.6 |
| 2014/0087629 | A1 * | 3/2014 | Takahashi | B24B 7/228 451/5 |
| 2014/0230926 | A1 * | 8/2014 | Bracht | F16K 17/02 137/494 |

FOREIGN PATENT DOCUMENTS

| | | | |
|---|---|---|---|
| GB | 2292234 | A | 2/1996 |
| JP | S59178315 | A | 10/1984 |
| WO | 0165120 | A2 | 9/2001 |
| WO | 2013098800 | A1 | 7/2013 |

OTHER PUBLICATIONS

International Search Report and Written Opinion of the International Searching Authority Application No. PCT/EP2013/065225 Completed: Apr. 4, 2014;Mailing Date: Apr. 15, 2014 11 pages.

* cited by examiner

DISCRETE PILOT STAGE VALVE ARRANGEMENT WITH FAIL FREEZE MODE

FIELD OF THE INVENTION

Embodiments presented herein relate to valves, and particularly to an on-off pilot stage valve arrangement for controlling at least one main stage valve.

BACKGROUND OF THE INVENTION

A valve is a device that regulates, directs or controls the flow of a fluid (gases, liquids, fluidized solids, or slurries) by opening, closing, or partially obstructing various passageways. In an open valve, fluid flows in a direction from higher pressure to lower pressure.

The simplest valve is simply a freely hinged flap which drops to obstruct the fluid flow in one direction, but is pushed open by flow in the opposite direction. This is called a check valve, as it prevents or "checks" the flow in one direction.

Valves have many uses, including controlling water for irrigation, industrial uses for controlling processes, residential uses such as on/off and pressure control to dish and clothes washers and taps in the home. Even aerosols have a tiny valve built in. Valves are also used in the military and transport applications.

Valves may be operated manually, either by a handle, lever, pedal or wheel. Valves may also be automatic, driven by changes in pressure, temperature, or flow. These changes may act upon a diaphragm or a piston which in turn activates the valve, examples of this type of valve found commonly are safety valves fitted to hot water systems or boilers.

More complex control systems using valves requiring automatic control based on an external input (i.e., regulating flow through a pipe to a changing set point) require an actuator. These valves requiring automatic control may also be termed process valves. An actuator will stroke the process valve depending on its input and set-up, allowing the valve to be positioned accurately, and allowing control over a variety of requirements.

Such an actuator may be operated using a set of main stage valves, operated by a pilot stage valve, which pilot stage valve operates based on received control signals.

There do exist "digital" pilot stage valves, operating between two states.

One such pilot stage valve for a digital main stage valve is described in U.S. Pat. No. 4,103,710.

In these pilot stage valves there is the question of how to handle a situation when power has been lost. In U.S. Pat. No. 4,103,710, the valve has a so-called fail safe behaviour at the loss of power, and therefore a pressure is provided to the main valve corresponding to a fully open pilot valve, which will put also the main valve in a fully open or a fully closed position.

This also means that the controlled process element, which is the above mentioned process valve main valve will end up being fully open or fully closed.

However, there are at times of interests to obtain a fail freeze behaviour and that is that the process valve should retain the same position it had before loss of power. This is not possible to obtain with the known digital pilot valve arrangements.

There is therefore a need for a pilot stage valve arrangement for a main stage valve, where the pilot valves of the pilot stage valve arrangement operate between an on and an off, which pilot valve arrangement has a fail freeze mode.

SUMMARY OF THE INVENTION

An object of embodiments herein is to provide improved valves and valve arrangements.

According to a first aspect there is presented an on-off pilot stage valve arrangement for controlling at least one main stage valve. The on-off pilot stage valve arrangement comprises a first pilot valve discretely operable between two states, an on and an off state. The first pilot valve has an input at which there is a first pressure and an output connected to the main stage valve. The on-off pilot stage valve arrangement comprises a second pilot valve discretely operable between two states, an on and an off state. The second pilot stage valve has an input at which there is a second pressure and an output connected to said main stage valve. Both the valves are configured to be set in one of the two states in case the arrangement loses power.

Advantageously, the on-off pilot stage valve arrangement allows the provision of a fail freeze mode, i.e. a mode where the main stage valves are not allowed to influence a controlled element. This mode is of importance in various control environments.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION OF THE INVENTION

The present disclosure will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
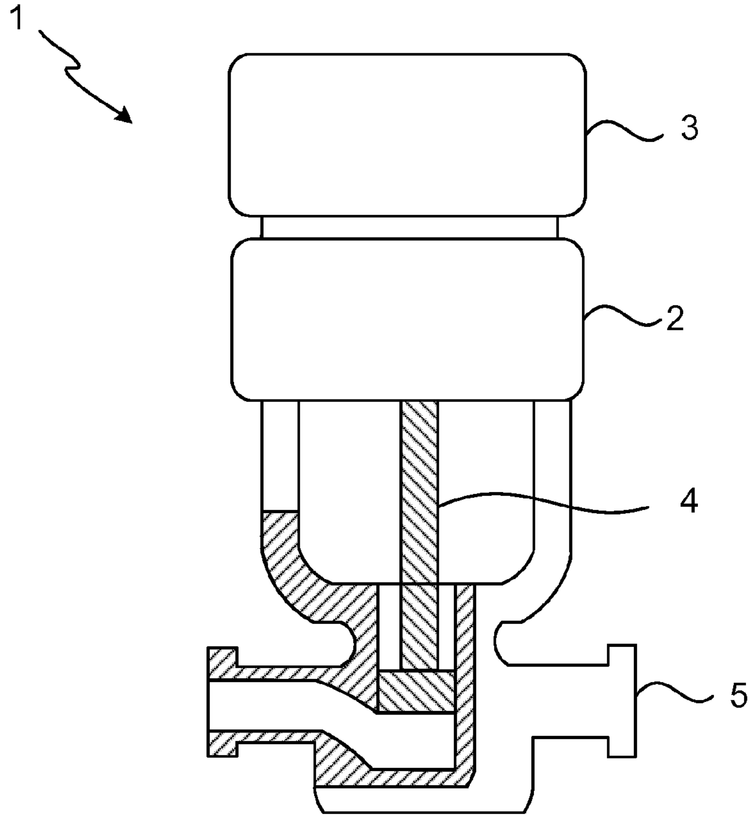
FIG. 1 is a schematic view of a valve system with pneumatic actuator and digital positioner according to embodiments.

To illustrate the enclosed embodiments reference is first made to an exemplary system in which an electro pneumatic positioner is used. FIG. 1 illustrates a digital positioner system 1. The digital positioner system 1 comprises an actuator 2, a positioner 3, a stem 4, and an actuated element 5. According to embodiments the actuated element 5 is a process valve. The digital positioner system 1 is denoted digital since the positioner 3 comprises a microprocessor.

The microprocessor is arranged to receive an electrical set-point signal (for example either as analog input (current signal) or via a bus interface such as Profibus) and a signal indicating the actual position of the actuated element 5. The sensor providing the signal indicating the actual position is not shown in FIG. 1. The positioner 3 is arranged to output pneumatic signals to the actuator 2. The actuator 2 is arranged to drive the actuated element 5 via the stem 4. Hence, the positioner 3 is arranged to receive an electric signal and to output a pneumatic pressure signal. In this sense, the pneumatic pressure signal is defined by the pneumatic pressure being the output from the positioner 3. The actuator 2 is therefore arranged to translate the pneumatic pressure into a force (or moment).

Figure 2:
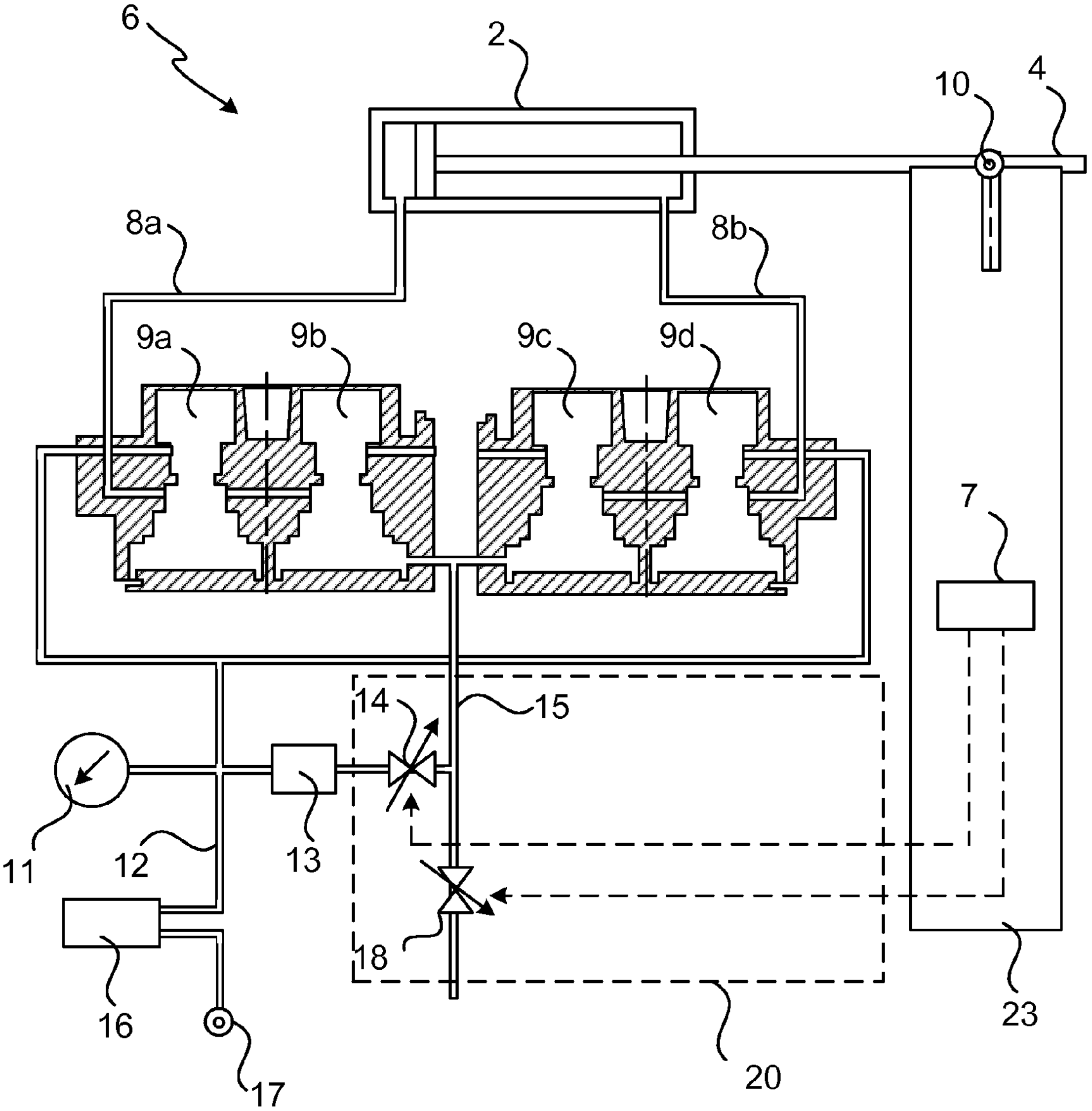
FIG. 2 is a schematic view of a digital positioner comprising an on-off pilot stage valve arrangement according to a first embodiment.

The positioner 3 comprises a plurality of devices and entities. FIG. 2 illustrates parts of a positioner as well as an actuator and a stem. In general terms, the main parts of the positioner are the one or more main stage valves 9*a*, 9*b*, 9*c*, 9*d*, an on-off pilot valve arrangement 20, and control electronics 23.

The at least one main stage valve 9*a-d* is a fully pneumatic component and functions as a pneumatic transistor. The at least one main stage valve 9*a-d* is coupled to an air supply network 17 via a supply air channel 12. Based on a control pressure provided by the on-off pilot stage valve arrangement 20 via a channel 15, the main stage valves 9*a-d* are opened and closed. The flows 8*a*, 8*b* through the one or more main stage valves 9*a-d* define the output of the positioner and these flows 8*a*, 8*b* are fed to the actuator 2. It is to be noted that the actuator 2 may comprise a return spring. In such a case only actuation of one channel of the actuator 2 is needed, thereby enabling cancelling of one pair of main stage valves, such as main stage valves 9*c* and 9*d* or main stage valves 9*a* and 9*b*.

The control electronics 23 comprises the microprocessor 7. The control electronics 23 are coupled to the actuator 2 via a sensor 10 positioned at the stem 4. The processor 7 of the control electronics 23 is arranged to determine if a control action is needed and what the value of that action should be by means of a positioning signal acquired from the sensor 10. The control action is by the control electronics 23 provided as an electrical signal, which is used as a control signal for controlling the on-off pilot stage valve arrangement.

The on-off pilot stage valve arrangement 20 comprises a first on-off pilot valve 18 and a second on-off pilot valve 14, where the first on-off valve 18 has an input at which there is a first pressure, which in FIG. 2 is atmospheric pressure, and an output connected to channel 15 and thereby it is connected to the main stage valves. In this way a first controllable fluid path is provided between a first pressure zone and the main stage valves. The first pressure zone is thus provided at the input of the first on off pilot valve 18 and in this zone the first pressure is provided. The first on-off pilot valve 18 is controllable, which is indicated with an arrow through the valve symbol. The second on-off valve 14 has an input at which there is a second pressure and an output connected to the channel 15 and thereby it is connected to the main stage valves. In this way a second controllable fluid path is provided between a second pressure zone and the main stage valves. The second pressure zone is thus provided at the input of the second on off pilot valve 14 and in this zone the second pressure is provided. The second on-off pilot valve 14 is also controllable, which is indicated with an arrow through the valve symbol. In order to obtain the second pressure, the input of the second on-off valve 14 is connected to a pressure regulator 13. The pressure regulator 13 may be coupled to the supply air channel 12. A pressure sensor 11 may be coupled to the supply air channel 12 so as to sense the pressure of the supply air. The supply air may be provided by a supply air regulator 16 which in turn is coupled to an air supply network 17. In this way the second on off pilot valve 14 is connected to a pneumatic pressure source.

As mentioned above, the first and second on-off valves may both be controlled, why separate control signals are indicated as being sent from the processor 7 to the two valves 14 and 18. In FIG. 2 two such control signals are indicated by dashed arrows.

Figure 3:
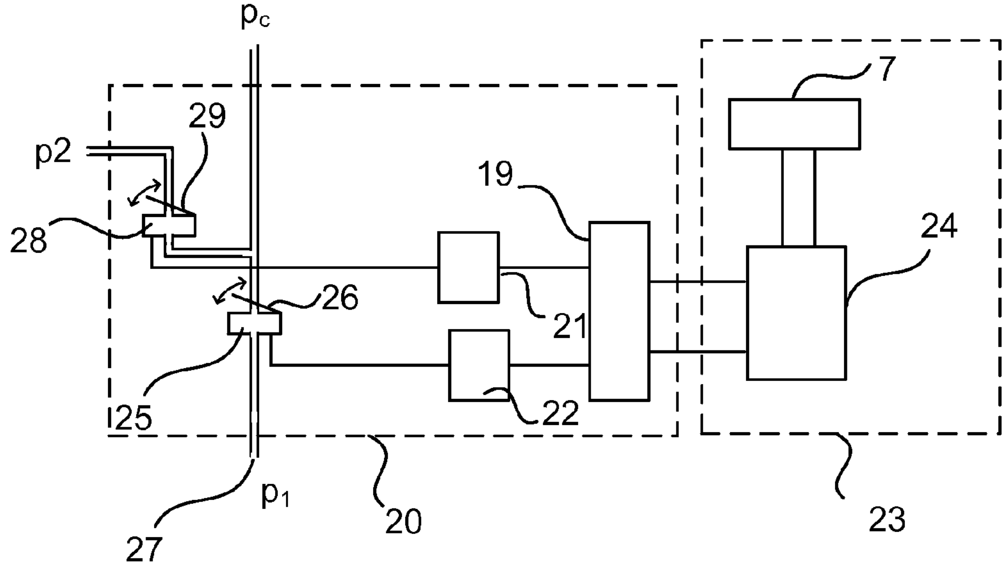
FIG. 3 is a schematic view of the on-off pilot stage valve arrangement in FIG. 2 together with relevant parts of control electronics.

How the valves may be realized can be seen in FIG. 3, which shows details of the pilot vale arrangement together with relevant parts of the control electronics 23.

The microprocessor 7 of the control electronics generates control signals, where it is possible with one control signal for each on off pilot valve. The control electronics 23 may further comprise a driver 24. The driver 24 may be arranged to receive the control signals from the microprocessor 7. The driver 24 may further be arranged to convert the control signals into discrete-valued electrical signals. The driver 24 may further be arranged to provide the discrete-valued electrical signals to a terminal 19 of the on-off pilot stage valve arrangement.

The first on off pilot valve may be realized through a nozzle 25 and a blade 26. The blade 26 may be movably arranged in relation to the nozzle 25 so as to open and close the nozzle 25. The arrangement may also comprise a first electromagnetic actuator 22. The electromagnetic actuator 22 may be provided as a solenoid; a coil with a magnetic core, wherein the wires of the coil are connected to the terminal 19. The electromagnetic actuator 22 may be arranged to receive a first of the discrete-valued electrical signals from the terminal 19, and to move the blade 26. For example, the solenoid may translate the first discrete-valued electrical signal into a force acting on the blade 26. The blade 26 is thereby enabled to open and close the nozzle 25. This in turn enables the nozzle 25 to provide a binary-valued pneumatic signal to the at least one main stage valve 9*a-d*.

Also the second on off valve may be realized through a nozzle 28 and a blade 29. The blade 29 may be movably arranged in relation to the nozzle 28 so as to open and close the nozzle 28. The arrangement 20 may also comprise a second electromagnetic actuator 21. The second electromagnetic actuator 21 may also be provided as a solenoid; a coil with a magnetic core, wherein the wires of the coil are connected to the terminal 19. The electromagnetic actuator 21 may be arranged to receive the second discrete-valued electrical signal from the terminal 19, and to move the blade 29. For example, the solenoid may translate the second discrete-valued electrical signal into a force acting on the blade 29. The blade 29 is thereby enabled to open and close the nozzle 28. This in turn also enables the nozzle 28 to provide a binary-valued pneumatic signal to the at least one main stage valve 9*a-d*.

In FIG. 3 also the first pressure $p_1$ at the input of the first on off valve, the second pressure $p_2$ at the input of the second on off valve as well as the output or control pressure $p_c$ emitted by the on-off pilot stage valve arrangement to the main valves can be seen.

The reason for denoting the valve arrangement 20 an on off pilot stage valve arrangement is because the pilot valves have an on an on-off (open-close) construction. The pilot stage valve arrangement 20 is therefore denoted an on-off pilot stage valve arrangement 20. The on-off pilot stage valve arrangement 20 is arranged to control at least one main stage valve 9*a-d*. The main stage valves may furthermore be provided in pairs at opposite ends of the controlled element. The on-off pilot stage may thus be arranged to control at least one pair of main stage valves. In the described embodiment the on off pilot stage valve arrangement controls two such pairs. The herein disclosed on-off pilot stage valve arrangement 20 can be used to control an air flow. More specifically the air flow may, by means of the herein disclosed on-off pilot stage valve arrangement 20, be controlled in a discrete way (such as between an on level and an off level, or more generally between a first level and a second level, wherein one level has higher flow than the other level) so as to regulate a flow in a (pseudo) continuous way. These two levels are typically provided through the first and second pressures, where the first pressure provides the first level and the second pressure the second level, where the second level may provide a higher flow than the first level.

In normal operation one of the pilot valves, for instance the second pilot valve 14, is in an off state, i.e. it is being in a closed position. At the same time the other valve, for instance the first pilot valve 18, is being discretely operated between the on and off states, i.e. it is being opened and closed. One of the pilot valves may thus not be used in operation. It is however used in the provision of a control pressure range within which the on-off pilot stage valve arrangement may operate.

In order to operate the main valves an indication of a required control action may be acquired. The indication may be provided by means of a discrete-valued electrical signal. The discrete-valued electrical signal may be a binary-valued electrical signal. As an alternative it may be a triple-valued or four-valued electrical signal. The discrete-valued electrical signal is provided by the control electronics 23.

As noted above, the flows 8*a*, 8*b* through the one or more main stage valves 9*a-d* define the output of the positioner and these flows 8*a*, 8*b* are fed to the actuator 2. The actuator 2 may by means of the flows 8*a*, 8*b* thereby be coupled to the at least one main stage valve 9*a-d*. As further noted above, the actuator 2 comprises a stem 4 which is movable between two end positions. The required control action may, according to embodiments relate to movement of the stem 4. The position sensor 10 may be arranged to sense a position of the stem 4 and to provide information relating to the position to the control electronics 23. The discrete-valued electrical signal provided by the control electronics 23 may relate to a position of the stem 4. The information provided by the sensor 10 may thus be regarded as feedback relating to an actual position of the stem 4. The feedback may in turn affect the discrete-valued electrical signal. The microprocessor 7 may be arranged to receive the information relating to the position from the sensor 10. The microprocessor 7 may further be arranged to determine the required control action in relation to the received information. The microprocessor 7 may further be arranged to generate a control signal in response to the required control action. The driver 25 may be arranged to receive the control signal from the microprocessor 7. The driver 25 may further be arranged to convert the control signal into a discrete-valued electrical signal. The driver 25 may further be arranged to provide the discrete-valued electrical signal to the terminal 22. Hence, the discrete-valued electrical signal may relate to a desired position of the stem 4 (by means of opening and closing the nozzle 25) and the feedback from the sensor 10 may be utilized in order to verify whether or not the actual position of the stem 4 corresponds to the desired position of the stem 4. If not, the discrete-valued electrical signal may by the microprocessor 7 of the control electronics 23 be adapted so as to move the stem 4 from its actual position to the desired position.

The pressurized media may be a gaseous media, such as air. The channel 15 may enable the pressurized media to, in turn, act on the at least one main stage valve 9*a-d*. The pressurized media is at the nozzle 26 provided to the channel 15. The channel has a volume. It is possible that pressure variations in the pressurized media are to be evened out, which may be accomplished through the volume of the channel 15.

By opening and closing a pilot valve of the on-off pilot stage valve arrangement 20, for instance the first pilot valve 18, in a repetitive and controlled manner, the average flow through the on-off pilot stage valve arrangement 20 can be regulated. The blade 26 may therefore be arranged to open and close the nozzle 25 in with a certain duty cycle, which means that the period or time interval in which it is open differs from the period or time interval in which it is closed. The duty cycle used a corresponding average flow of the pressurized media through the nozzle 25. In the pilot valve 18 it is thus the duty cycle of the signal that is related to the flow through the nozzle 25 (independently of the type of modulation used).

Figure 4:
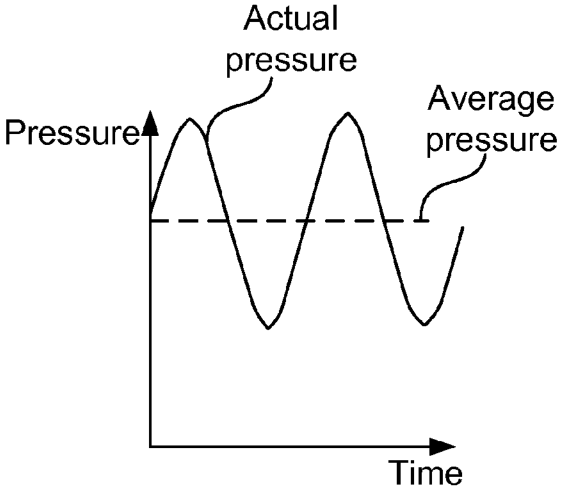
FIG. 4 schematically illustrates a pneumatic signal with average and pulsating component.

The pulsing of the binary-valued pneumatic signal may lead to strong variations in the flow through the nozzle 25. This in turn leads to pressure variations in the control pressure of the channel 15. The flow in the channel 15 may thus be regarded as composed of a constant component, i.e. the average value, and a variable component. This is reflected in FIG. 4. FIG. 4 illustrates an actual pressure behaviour over time as well as the average pressure (i.e. the mean of the actual pressure over time). In general terms. the on-off pilot stage valve arrangement 20 is thus arranged to generate and output a binary-valued pneumatic signal. However when ‘arriving’ at the at least one main stage valve 9*a-d* the signal will have become analog with a pulsation on top of it, due to the volume of the channel 15 connecting the pilot stage valve 19 to the at least one main stage valve 9*a-d*. Hence the binary-valued pneumatic signal may, by means of the channel 15, be regarded as being transformed into an analog-valued pneumatic signal having an average pressure. The pulsed component (as represented by the actual pressure) may be used for control of the at least one main stage valve 9*a-d*. For example, the pulsation may prevent the valves of the main stage valves 9*a-d* from “sticking” and thus create a more reliable/reproducible lift-off.

Each respective average flow of the pressurized media may thus be regarded as corresponding to an analog output level. The thus formed analog output signal is generated from the binary-valued pneumatic signal and may thus be regarded as a quasi-analog output signal. To be able to create such a quasi-analog output the on-off pilot stage valve arrangement 20 needs to be switched between opened and closed in a quick and repetitive way employing the above mentioned duty cycle. The binary-valued pneumatic signal is based on a discrete-valued electrical signal; the required control action may have at least two values. In general terms the average pressure may be proportional to the duty cycle; the higher the duty cycle, the higher the average pressure. As noted above the discrete-valued electrical signal may for example be a binary-valued, a triple-valued, or a four-valued electrical signal. The value of the electrical signal may be related to the duty cycle, the pressure of the binary-valued pneumatic signal, and/or how to control the blade 26 so as to open or close the nozzle 25 as well as to hold the blade 26 in the opened or closed position.

It is thus to be noted that the average pressure is the wanted output since the average pressure defines, depending on the duty cycle, the quasi-analog output level. This average pressure can change with time, however generally at a slower rate of change than the pulsing of the on-off pilot stage valve arrangement 20. The pressure variations caused by the on-off repetitions of the on-off pilot stage valve arrangement 20 may be considered parasitic even though they may be used for further control purposes. The amplitude of the pulsations can be influenced by the dimensions of the inlet of the channel 15 that is connected to the nozzle 18.

Figure 5:
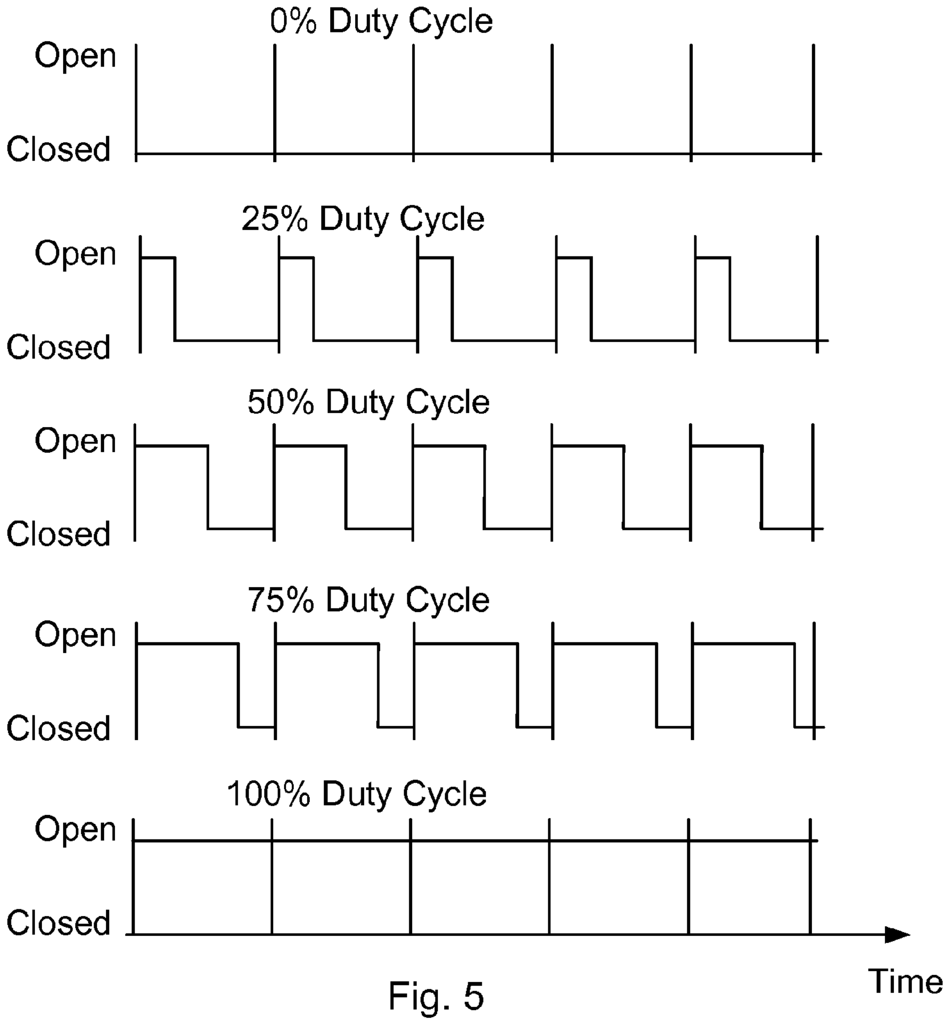
FIG. 5 schematically illustrates pulse width modulation of a valve.

The on-off repetitions of the on-off pilot stage valve arrangement 20 may be enabled by provision of a pulse width modulated discrete-valued electrical signal. As noted above, the on-off pilot stage valve arrangement is configured to translate the discrete-valued electrical signal into a binary-valued pneumatic signal. For example, as noted above the microprocessor 7 may determine the need for a control action. The control action may imply that the pressure/flow in the channel 15 should be affected. The microprocessor 7 may therefore determine a new duty cycle value (as the duty cycle may have a direct relationship to average pressure/flow at the channel 15). The duty cycle may be provided by Pulse Width Modulation (PWM) of the discrete-valued electrical signal (and hence of the binary-valued pneumatic signal). The on-off pilot stage valve arrangement 20 is switched with a base frequency, and the duty cycle (i.e. the relative open time) of the on-off pilot stage valve arrangement 20 is varied. Hence, according to an embodiment the discrete-valued electrical signal is a PWM signal used for opening and closing a pilot stage valve, for instance the first pilot valve 18. FIG. 5 illustrates different PWM modulated binary-valued pneumatic signals obtained through such opening an closing of a pilot valve and associated with respective duty cycles (0%, 25%, 50%, 75%, and 100%, respectively). That duty cycle value may thus be translated into a pulse train of open/close signals, such as illustrated in FIG. 5. The low-level of the discrete-valued electrical signal corresponds to a closed-level of the binary-valued pneumatic signal, and the high-level of the discrete-valued electrical signal corresponds to an open-level of the binary-valued pneumatic signal, or vice versa. How to generate a discrete-valued electrical signal with a duty cycle based on PWM parameters is as such known in the art and a description thereof is therefore omitted. Other forms of control of the on-off pilot stage valve arrangement are possible too. The pulse train may be received by the driver 24 that may translate the pulse train into a (possibly more complex) electrical signal that controls the opening and closing of the on-off pilot stage valve arrangement 20 as well as holding the on-off pilot stage valve arrangement 20 in the opened and closed positions, respectively. The electrical signal thus generated by the driver 24 is provided to the terminal 22 and therefrom to the electromagnetic actuator 22 that thus actuates on the blade 26 so as for the blade 26 to open, close, or hold the nozzle 25. The electrical signal provided by the driver 24 thus contains the energy to actually move the blade 26 from one state to the other (and to keep it in these states). By opening the nozzle 25 there is more leakage to the environment (as represented by the environment vent 27) which results in a decreased pressure in channel 15 and vice versa.

Above was described the normal operation of the on-off pilot stage valve arrangement. It should be realized that the control described in relation to the first on off valve may be performed in relation also to the second on off valve in order to vary the pressure. The operation of the first on-off valve typically provides pressure variations between the first pressure $p_1$ and an average pressure formed based on the first and second pressures $p_1$ and $p_2$, while the operation of the second on-off valve provides pressure variations between average pressure and the second pressure $p_2$.

However, there may at times be a power loss in the arrangement. When there is a power loss a pilot valve cannot be operated, but will be in one of the two states on or off, i.e. in one of the two positions, either being closed or being open.

In a first embodiment the two on-off pilot valves are both configured to be in an on state when they lose power, which may be that they are both open.

This means that if power is lost, so that the valves of the on-off pilot stage valve arrangement are impossible to control, then both the first and second on-off valve will be open. This will in turn lead to the control pressure $p_c$ being a pressure in between the first and second pressures, i.e. a pressure in between the two extremes used for providing the above-described binary pressure signal, for instance a pressure of $p_c=(p_1-p_2)/2$. The output to the at least one main stage valve will thereby receive a pressure that is in-between the first and second pressures if the on-off pilot stage valve arrangement loses power. This pressure will not be sufficient to influence the main stage valves 9*a*, 9*b* an 9*c* and 9*d* and consequently the actuator 2 will also not be influenced and instead stay in the position it had before power was lost. Thereby a so called failed freeze situation is obtained where the main stage valves are not allowed to influence the controlled element, which is exemplified by the actuator. This situation would not be possible to obtain if there was only one on-off pilot valve. If there were only one on-off pilot valve the actuator end up having one of its extreme positions.

It may be possible to use also valves that are being in the off state when losing power. This may be possible if they are not completely closed in the off state, but allows a small or insignificant flow. This insignificant flow will have only marginal influence on the normal operation, but may be used to obtain the desired pressure change.

Figure 6:
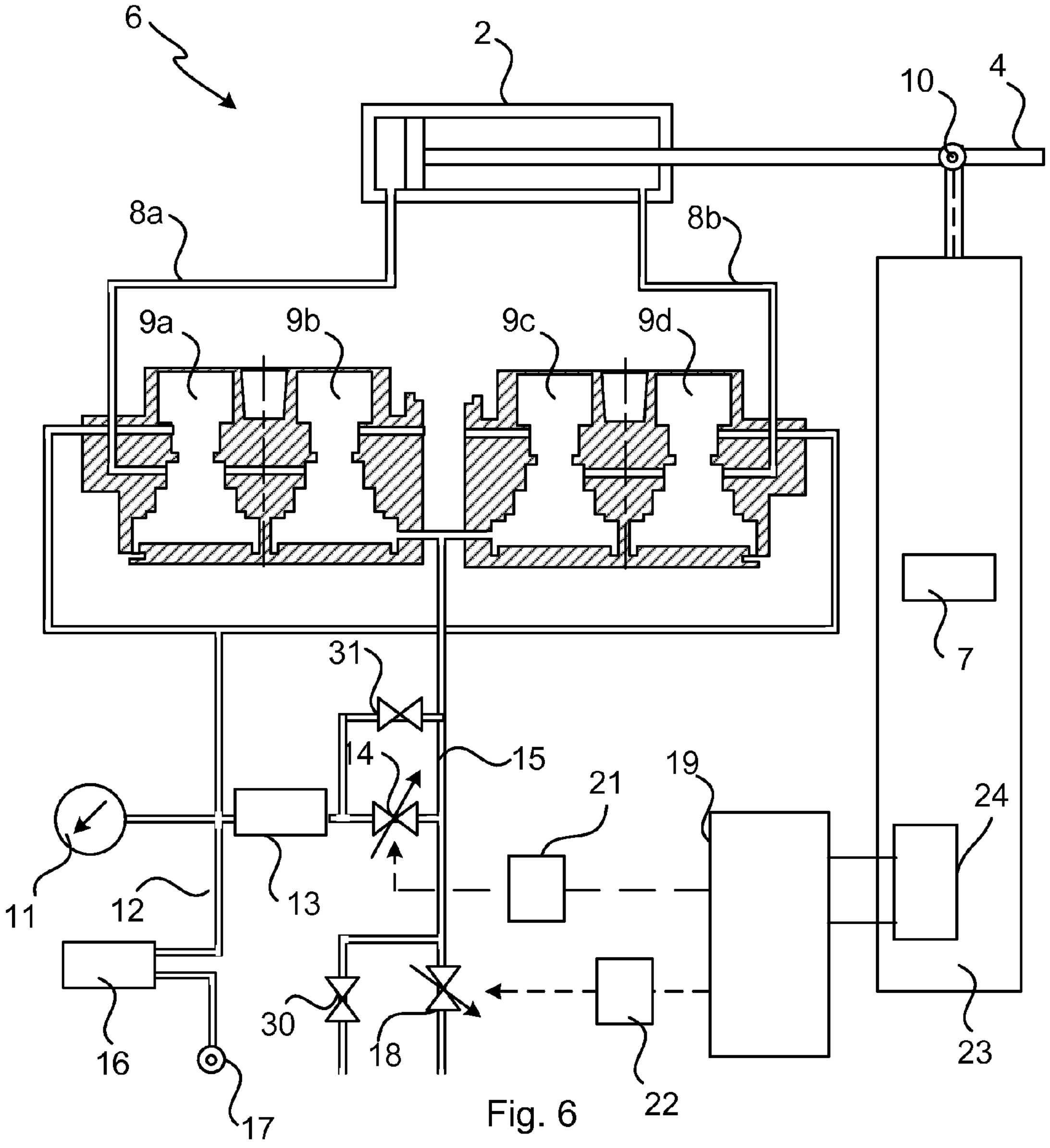
FIG. 6 shows a schematic view of a digital positioner comprising an on-off pilot stage valve arrangement according to a second embodiment.

If the first and second on-off pilot valves are completely closed when entering the off state when power is lost it is possible to obtain a pressure in between the extremes with the system shown in FIG. 6. In this case there is provided a first fixed flow restrictor 30 connected in parallel with the first pilot stage valve 18. The first follow restrictor 30 has an input provided at the first pressure level $p_1$ and an output leading to channel 15. There is also a second fixed flow restrictor 31 connected in parallel with the second on-off pilot valve 14. The second follow restrictor 31 has an input provided at the second pressure level $p_2$ and an output leading to channel 15.

In normal operation, when for instance the first on-off pilot valve 18 is controlled to change between the on and the off states with the second on-off pilot valve 14 being in the off state, the first and second fixed flow restrictor 30 and 31 will have an influence on the control pressure that is constant. Thereby their influence on the control is limited It can also be seen that as both valves are off when there is a loss of power, then these fixed flow restrictors will provide an output pressure that is between the two extremes. It can thus be seen that a fail freeze operation is obtained also in this case.

Above the control pressure obtained in the fail freeze mode was exemplified by $(p_2-p1)/2$. It is possible that virtually any pressure in between $p_1$ and $p_2$ could be used as long as a change of the main valves is avoided.

The invention has mainly been described above with reference to a few embodiments. However, as is readily appreciated by a person skilled in the art, other embodiments than the ones disclosed above are equally possible within the scope of the invention, as defined by the appended patent claims. For example, any of the disclosed valves and valve arrangements may be used in any applications where a fail freeze operation is needed. It is for instance possible with other types of valve elements than a blade 26 for closing and opening a nozzle. It is noted that any of the disclosed valves and valve arrangements enables a controllable opening behaviour, making it possible to regulate small flow volumes. Any of the disclosed valves and valve arrangements may be applied in digital positioners, such as models TZIDC and EDP300 from ABB Ltd. Also, any of the disclosed valves and valve arrangements may be applied in mechanical positioners, such as in the AV-series from ABB Ltd. Any of the disclosed valves and valve arrangements may further be applied in other applications where a pressurized medium flow is to be regulated. One example is proportional pneumatic valves. Further examples include, but are not limited to (electro-pneumatic) positioners, controlling valves in chemical plants, controlling pressurized medium valves in power plants, as well as valves for controlling other elements that need actuation.

The invention claimed is:

1. An on-off pilot stage valve arrangement for controlling at least one main stage valve, comprising:

a first pilot valve discretely electrically operable between two states, an on state wherein the first pilot valve is open and an off state wherein the first pilot valve is closed, the first pilot valve having an input at which there is a first pressure and an output connected to said main stage valve, a second pilot valve discretely electrically operable between two states, an on state wherein the second pilot valve is open and an off state wherein the second pilot valve is closed, the second pilot stage valve having an input at which there is a second pressure and an output connected to said main stage valve, wherein both the pilot valves are configured to be off in case the arrangement loses electrical power, the arrangement further comprising a first fixed flow restrictor connected between the first pressure and the main stage valve and in parallel with the first pilot valve and a second fixed flow restrictor connected between the second pressure and the main stage valve and in parallel with the second pilot valve.

2. The on-off pilot stage valve arrangement according to claim 1, further comprising a terminal arranged to acquire an indication of a required control action on a controlled element (2), the indication provided by means of a discrete-valued electrical signal; wherein at least one of the pilot valves is configured to be operated based on the discrete valued electrical signal for providing a binary-valued pneumatic signal to at least one main stage valve so as to enable the at least one main stage valve to perform the required control action on the controlled element.

3. The on-off pilot stage valve arrangement according to claim 2, wherein an on off valve comprises:

a nozzle arranged to provide the binary-valued pneumatic signal to the at least one main stage valve; and a blade movably arranged in relation to the nozzle so as to open and close the nozzle, thereby enabling the nozzle to provide the binary-valued pneumatic signal to the at least one main stage valve;

the on-off pilot stage valve arrangement further comprising an electromagnetic actuator arranged to receive the discrete-valued electrical signal from the terminal, and to move the blade, thereby enabling the blade to open and close the nozzle.

4. The on-off pilot stage valve arrangement according to claim 3, wherein the blade is movably arranged to enable the binary-valued pneumatic signal to act on a pressurized media so as to control a flow of the pressurized media, and a channel for enabling the pressurized media to, in turn, act on the at least one main stage valve.

5. The on-off pilot stage valve arrangement according to claim 4, wherein the pressurized media is provided by the nozzle to the channel, the channel having a volume, the volume enabling pressure variations in the binary-valued pneumatic signal to be evened out.

6. The on-off pilot stage valve arrangement according to claim 3, wherein the blade is arranged to open and close the nozzle in a repetitive manner.

7. The on-off pilot stage valve arrangement according to claim 6, wherein the blade is arranged to open and close the nozzle based on a duty cycle of the discrete-valued electrical signal.

8. The on-off pilot stage valve arrangement according to claim 7, wherein the discrete-valued electrical signal is a pulse width modulation, PWM, signal.

9. The on-off pilot stage valve arrangement according to claim 6, further comprising:

at least one main stage valve arranged to perform the required control action on the controlled element.

10. The on-off pilot stage valve arrangement according to claim 9, wherein there is at least one pair of main stage valves.

11. The on-off pilot stage valve arrangement according to claim 9, further comprising:

wherein the controlled element is an actuator coupled to said at least one main stage valve, the actuator comprising a stem being movable between two end positions; and wherein the required control action relates to movement of the stem.

12. The on-off pilot stage valve arrangement according to claim 11, further comprising:

control electronics arranged to provide the discrete-valued electrical signal to the terminal; and a position sensor arranged to sense a position of the stem and to provide information relating to said position to the control electronics.

13. The on-off pilot stage valve arrangement according to claim 12, wherein the control electronics comprises:

a microprocessor arranged to receive the information relating to said position, to determine the required control action in relation thereto, and to generate a control signal in response thereto; and a drivers arranged to receive the control signal, to convert the control signal into the discrete-valued electrical signal, and to provide the discrete-valued electrical signal to the terminal.

* * * * *